United States Patent
Duffield et al.

(10) Patent No.: US 7,420,649 B2
(45) Date of Patent: Sep. 2, 2008

(54) THEATER IDENTIFICATION SYSTEM UTILIZING IDENTIFIERS PROJECTED THROUGH A SCREEN

(75) Inventors: David Jay Duffield, Princeton, NJ (US); Mark Alan Schultz, Carmel, IN (US); Michael Allan Sterling, Woodland Hills, CA (US)

(73) Assignee: Thomson Licensing, Boulogne Billancourt (FR)

( * ) Notice: Subject to any disclaimer, the term of this patent is extended or adjusted under 35 U.S.C. 154(b) by 309 days.

(21) Appl. No.: 10/567,954

(22) PCT Filed: Jul. 28, 2004

(86) PCT No.: PCT/US2004/024074

§ 371 (c)(1),
(2), (4) Date: Feb. 10, 2006

(87) PCT Pub. No.: WO2005/020570

PCT Pub. Date: Mar. 3, 2005

(65) Prior Publication Data

US 2006/0291722 A1    Dec. 28, 2006

Related U.S. Application Data

(60) Provisional application No. 60/496,116, filed on Aug. 19, 2003.

(51) Int. Cl.
*G03B 21/32* (2006.01)

(52) U.S. Cl. .......................................... 352/90; 352/40

(58) Field of Classification Search .................. 352/38, 352/40, 85, 90
See application file for complete search history.

(56) References Cited

U.S. PATENT DOCUMENTS

| 5,959,717 | A | 9/1999 | Chaum |
| 6,018,374 | A | 1/2000 | Wrobleski |
| 6,559,883 | B1 | 5/2003 | Fancher et al. |
| 6,742,901 | B2 | 6/2004 | Kimura et al. |
| 6,772,349 | B1 | 8/2004 | Martin et al. |
| 6,809,792 | B1 * | 10/2004 | Tehranchi et al. ............. 352/85 |
| 2002/0171813 | A1 | 11/2002 | Kimura et al. |
| 2004/0062393 | A1 | 4/2004 | Sitrick et al. |
| 2006/0262280 | A1 * | 11/2006 | Duffield et al. ............... 353/46 |

OTHER PUBLICATIONS

Search Report Dated Oct. 12, 2004.

* cited by examiner

*Primary Examiner*—Rodney E Fuller
(74) *Attorney, Agent, or Firm*—Joseph J. Laks; Paul P. Kiel; Joseph J. Opalach (57) ABSTRACT

A method and a system for identifying a copy of an image sequence which is presented on a screen. At least one identifier distinct from the image sequence can be projected through the screen such that the identifier is displayed using visible light along with the image sequence. The identifier can be presented at periodic intervals and can define a theater location, a date and/or a time. A color and/or an illumination of at least a portion of the image sequence presentation can be measured. Based on the measured illumination and/or color, a projection brightness and/or color can be determined for the identifier. Also, a location on the screen through which the identifier should be projected can be determined.

29 Claims, 7 Drawing Sheets

| Byte | Bit 7 | Bit 6 | Bit 5 | Bit 4 | Bit 3 | Bit 2 | Bit 1 | Bit 0 |
|---|---|---|---|---|---|---|---|---|
| 0 | Parity0 | TID13 | TID12 | TID11 | TID10 | TID9 | TID8 | TID7 |
| 1 | Parity1 | TID6 | TID5 | TID4 | TID3 | TID2 | TID1 | TID0 |
| 2 | Parity2 | Jul8 | Jul7 | Jul6 | Jul5 | Jul4 | Jul3 | Jul2 |
| 3 | Parity3 | Jul1 | Jul0 | Time4 | Time3 | Time2 | Time1 | Time0 |
| 4 | FEC byte | | | | | | | |

505

THEATER IDENTIFICATION SYSTEM UTILIZING IDENTIFIERS PROJECTED THROUGH A SCREEN

This application claims the benefit, under 35 U.S.C. § 365 of International Application PCT/US2004/024074, filed Jul. 28, 2004, which was published in accordance with PCT Article 21(2) on Mar. 3, 2005 in English and which claims the benefit of U.S. provisional patent application No. 60/496,116, filed Aug. 19, 2003.

BACKGROUND OF THE INVENTION

The inventive arrangements relate generally to the field of protecting film against illegal copying, and in particular, to a method for identification of the source of films illegally copied by camcorders.

Copyright infringement resulting from the piracy of motion picture films is a wide spread problem. Once a film distributor distributes prints of a motion picture film to exhibitors for theatrical exhibition, a certain degree of control over the product is lost. In the regular course of exhibiting the film, a customer in the theater may surreptitiously record the film using, e.g., a hand held camcorder. At a more sophisticated level, a person seeking to obtain an illegal copy of a film print may gain access to a theater projection booth in collusion with an employee of the exhibitor and make a copy of the film after hours in a relatively controlled environment. In such an environment, the audio from the projection equipment can be directly fed to the camcorder. A tripod can be used to ensure a clear and steady picture. As a result, an illicit copy can be made.

In 1982, the Motion Picture Association of America (MPAA), together with the Kodak Corporation, developed a technology for uniquely identifying film prints. This technology is commonly known as Coded Anti-piracy (CAP) coding. The code is a series of faint dots in the picture that are added as the print is manufactured. Approximately one out of every hundred frames contains four tiny dots that have been added to the image. Generally, 11 CAP-coded frames are required to reconstitute the serial number of the movie print. Each unique configuration of dots corresponds to a print identifier.

The film prints are usually coded for each theater in which a film is distributed. If CAP coded films are re-used, for example in theaters specializing in the presentation of older films, the identification of a theater being used to make illegal film prints may become impossible. Thus, a new film print must be generated for each theater in which a film is to be shown. The generation of film prints is relatively expensive, however. Moreover, it is expensive and cumbersome to maintain a library of interpositives from which new film prints can be generated for subsequent re-releases of films. Thus, a method is needed for identifying a theater in which an illegal copy of a film is made, regardless of whether the film is CAP coded.

SUMMARY OF THE INVENTION

The present invention relates to a method for identifying, or marking, a copy of an image sequence, e.g., a video or film, which is presented on a screen. Specifically, from a position located behind a screen, at least one identifier distinct from the image sequence can be projected through the screen such that the identifier is displayed on the screen using visible light along with the image sequence. Illustratively, the identifier can be presented at periodic intervals and can define a theater location, a date and/or a time. Further, an illumination and/or a color of at least a portion of the image sequence presentation can be measured. Based on the measured illumination and/or color, a projection brightness and/or color can be determined for the identifier. A projection location where the identifier should be projected through the screen also can be determined.

The invention also includes a system for identifying, or marking, a copy of an image sequence which is presented on a screen. The system comprises a pattern generator for projecting through the screen at least one identifier distinct from the image sequence such that the identifier is displayed using visible light along with the image sequence. The identifier can be presented at periodic intervals and can define a theater location, a date and/or a time. Further, the system also can include a detector for measuring an illumination and/or a color of at least a portion of the video presentation. A processor also can be provided for determining projection brightness and/or color for the identifier based upon the measured illumination and/or color. The processor also can determine a location on the screen through which at least one identifier is projected based upon the measured illumination. The processor and the detector can be contained within the pattern generator.

DETAILED DESCRIPTION

An embodiment in accordance with the present invention pertains to a method for projecting one or more identifiers through perforations in a projection screen during a video presentation to generate a marking pattern such that if the video presentation is recorded—the marking pattern is also recorded. Illustratively, the marking pattern can identify a location, or facility, where the video presentation occurred, as well as the date and time at which the video presentation occurred. Further, in addition to identifying a facility in which the video presentation occurred, the projection screen within the facility that was used for the presentation also can be identified. Thus, if an illicit copy of a film is made from a video presentation, the illicit copy can be evaluated to determine when and where the copy was made. Since this advantageous optical marking is performed during a video presentation, rather than on the print of the video, there is no potential problem with marking a print that may be subsequently used at a different location or for a different purpose.

Other systems have used infrared (IR) light sources to degrade a captured image in a capture device. While this works in many cases, it is subject to circumvention. Some image capture devices are not sensitive to infrared wavelengths of light, and those that are sensitive to infrared light can be used with commonly available IR filters to mask the infrared wavelengths. (Such as the XNiteCC137 sold by LDP Net, Woodcliff Lake N.J. at www.maxmax.com.) However, and in accordance with the principles of the invention, by using small amounts of visible light to create marks in the captured image, the use of such filters is prevented, and the likelihood that the marks will not be noticed and/or removed by the operator of a rogue image capture device is increased.

Figure 1:
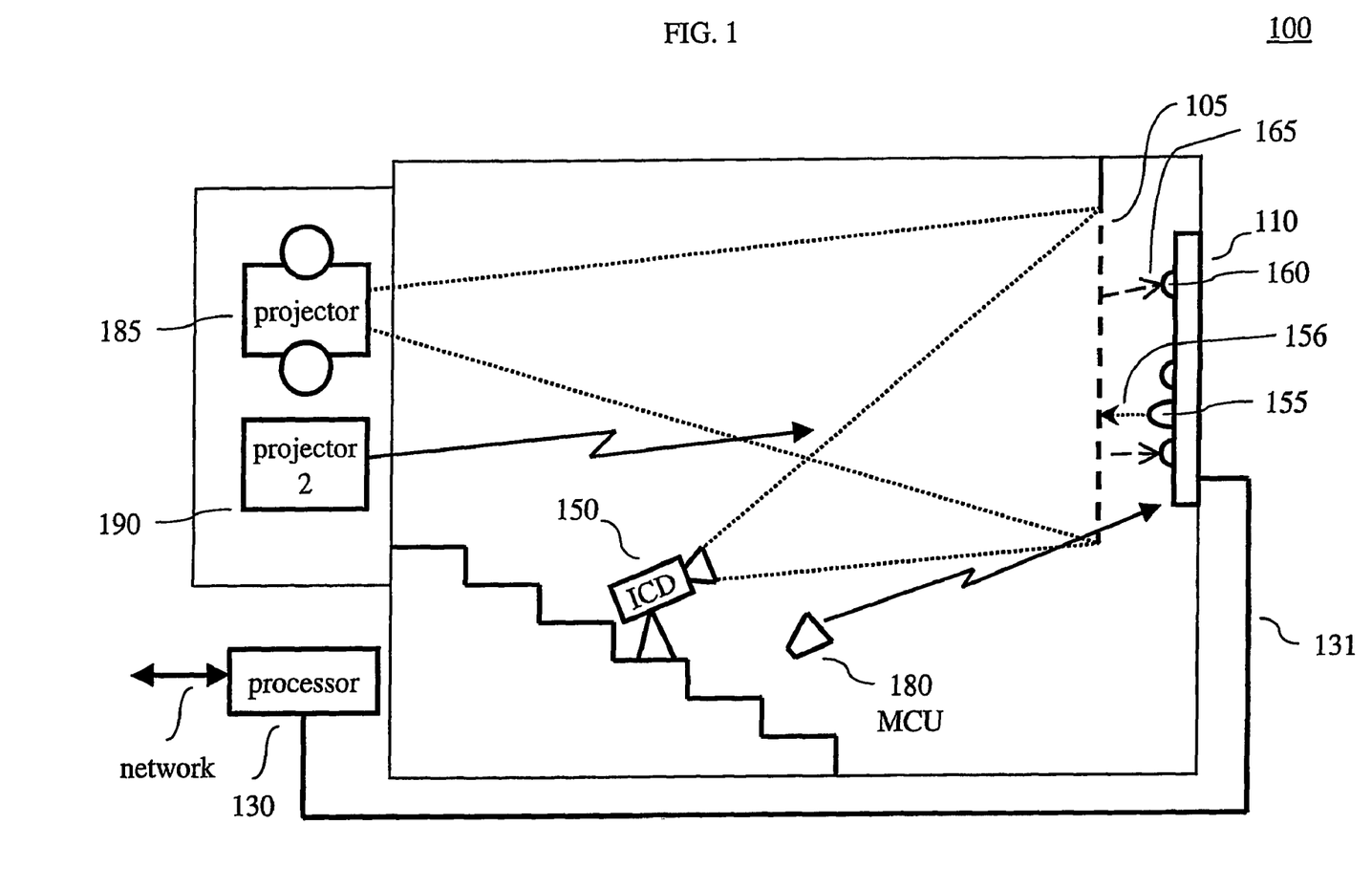
FIG. 1 is a diagram of a video projection system that is useful for understanding the invention.

A system 100 is depicted in FIG. 1 which displays a marking pattern on, or within, a video presentation. The system 100 can be disposed within a screen room, an editing facility, a theater, or any other location where a video presentation can occur. Projection screens in most movie theaters are perforated, which allows loudspeakers to be positioned behind the projection screen to project sound through the perforations. Light also can project through the perforations, however. Thus, the screen 105 can be perforated. A pattern generator 110 can be located behind the screen 105 to project identifiers through the screen 105 and display the marking pattern. Importantly, the present invention is not limited to those screens which are perforated to facilitate the projection of sound. For example, the perforations only need be large enough to allow at least some light to project through the screen. In another arrangement, the screen 105 can be a screen made of a material which is at least partially transparent to light.

The marking pattern can be encoded with the location, date and time information. Thus, the marking pattern can be encoded into an illicit copy of a video presentation recorded by an image capture device 150. In particular, the marking pattern will be detectable within frames of the illicit copy. This arrangement offers several distinct benefits. For instance, the pattern generator 110 can be physically located in a position such as to preclude or deter intervention by someone wishing to inhibit, obscure or circumvent its operation. The pattern generator 110 also can be arranged so as to not create a black level shift in a viewed image. Further, the pattern generator 110 can use light sources 155 which do not require a warm up period. The pattern generator 110 projects the marking pattern 156, via light sources 155, onto screen 105.

The pattern generator 110 can be powered by an AC power supply having a battery backup. Thus, the device can run continuously regardless of the theater's usage. Additionally, the amount of power used by the pattern generator 110 can be very small. For example an optimized design can provide backup operation for hours, days or even weeks following an AC supply interruption.

In another arrangement, the pattern generator 110 can adaptively modify the brightness, color and/or location on the screen 105 through which the identifiers are projected, thereby mitigating the contradictory requirements of durably marking a copy of a video presentation formed by an image capture device 150, while obviating or minimizing any audience distraction. The illumination and/or color of a light incident on the screen 105 during a video presentation can be measured with one or more suitable detectors 160 that generate data correlating to the illumination and/or color of the light. Based on the data, the brightness and/or color of identifiers used in the marking pattern can be selected. Thus, the identifiers can be bright enough to be visible in a white scene area, but can be rendered unobjectionable during a dark scene.

The detector 160 can be placed behind the screen 105 to detect screen exit rays 165 which propagate through the perforations. In a preferred arrangement, the detector 160 can detect light in one or more areas of the screen 105 where the identifiers will be projected. The detector 160 can be calibrated to correlate the generated data to the color and/or illumination of the light incident on the screen 105. Further, the detector 160 can be operatively connected to the pattern generator 110. For example, the pattern generator 110 can be provided with a processing device (not shown) which can process illumination/color data received from the detector 160 so that the pattern generator 110 projects the identifiers with the appropriate brightness and/or color. Also, in an embodiment in which the location on the screen 105 through which the identifiers are projected is selectable, the data can be used to determine optimum identifier placement based upon the illumination and/or color characteristics of a scene currently being displayed. Notably, the detector can be incorporated into the pattern generator.

Figure 2:
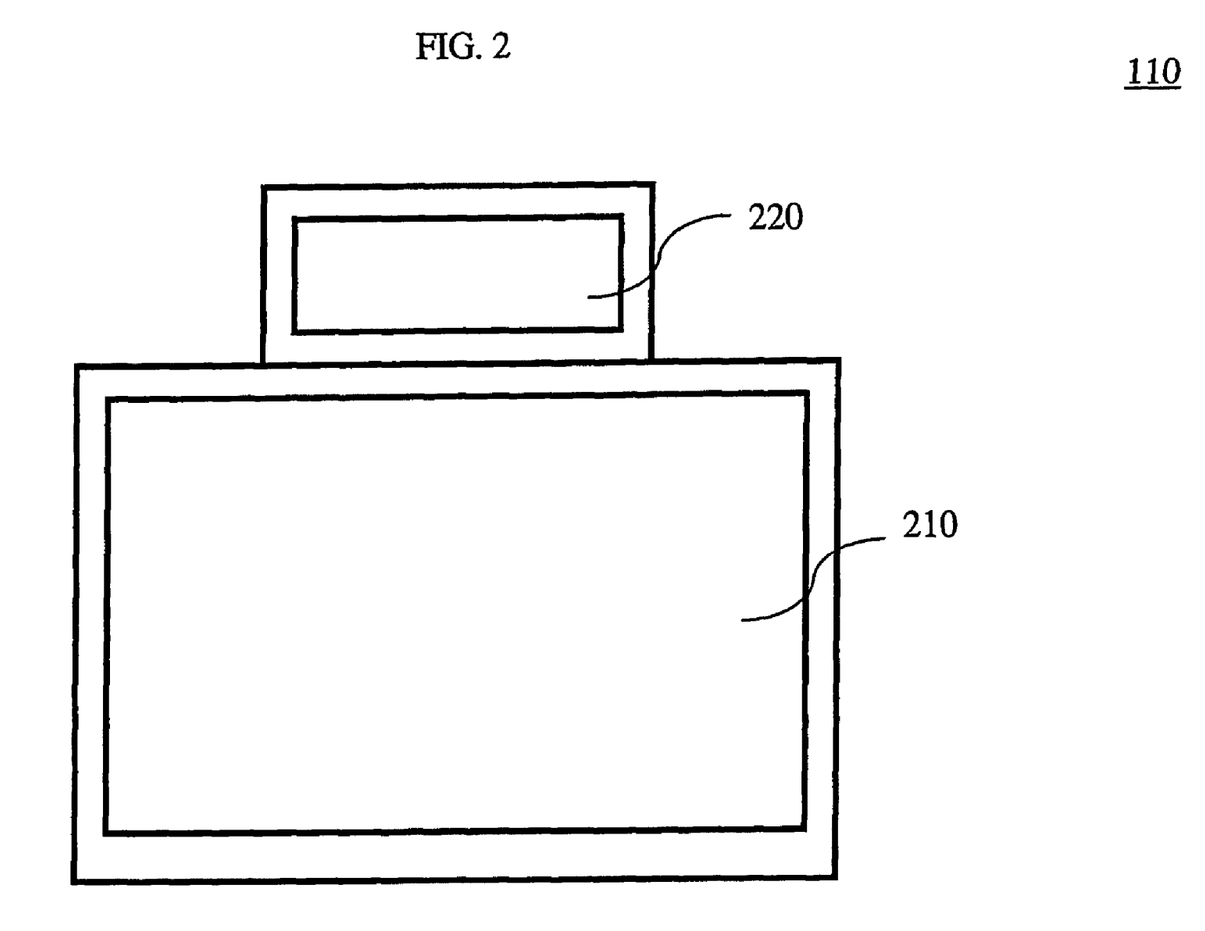
FIG. 2 shows a front view of an exemplary light emitting surface of a pattern generator that is useful for understanding the invention.

Referring to FIG. 2, a front view of an exemplary light emitting surface 210 of a pattern generator 110 is shown. The pattern generator 110 can be a display such as a liquid crystal display (LCD), a digital light processing (DLP) display, liquid crystal on silicon (LCOS) display, a plasma display, a cathode ray tube, or any other type of display that can generate patterns of light. In a preferred arrangement, the color and intensity of the patterns of light are selectable.

As illustrated in FIG. 2, the pattern generator 110 also can include a detector. The detector can comprise a frame imaging camera sensor (imaging sensor) 220 capable of imaging screen exit rays. An image signal generated by the imaging sensor 220 can be processed to provide a near real time spatial screen map of illumination and color information associated with a projected image. This screen map can be processed to adaptively control the brightness and color of identifiers generated by the pattern generator 110. Also, optimal screen locations for identifiers can be determined. Ideally, the picture rate of the imaging sensor should be sufficiently rapid and the integration time should be sufficiently short so that the screen map can be established from a single projector shutter opening and the identifiers can be displayed during subsequent exposures of the current film frame. For example, the imaging sensor can be a high frame rate imaging device having low spatial resolution.

Figure 3:
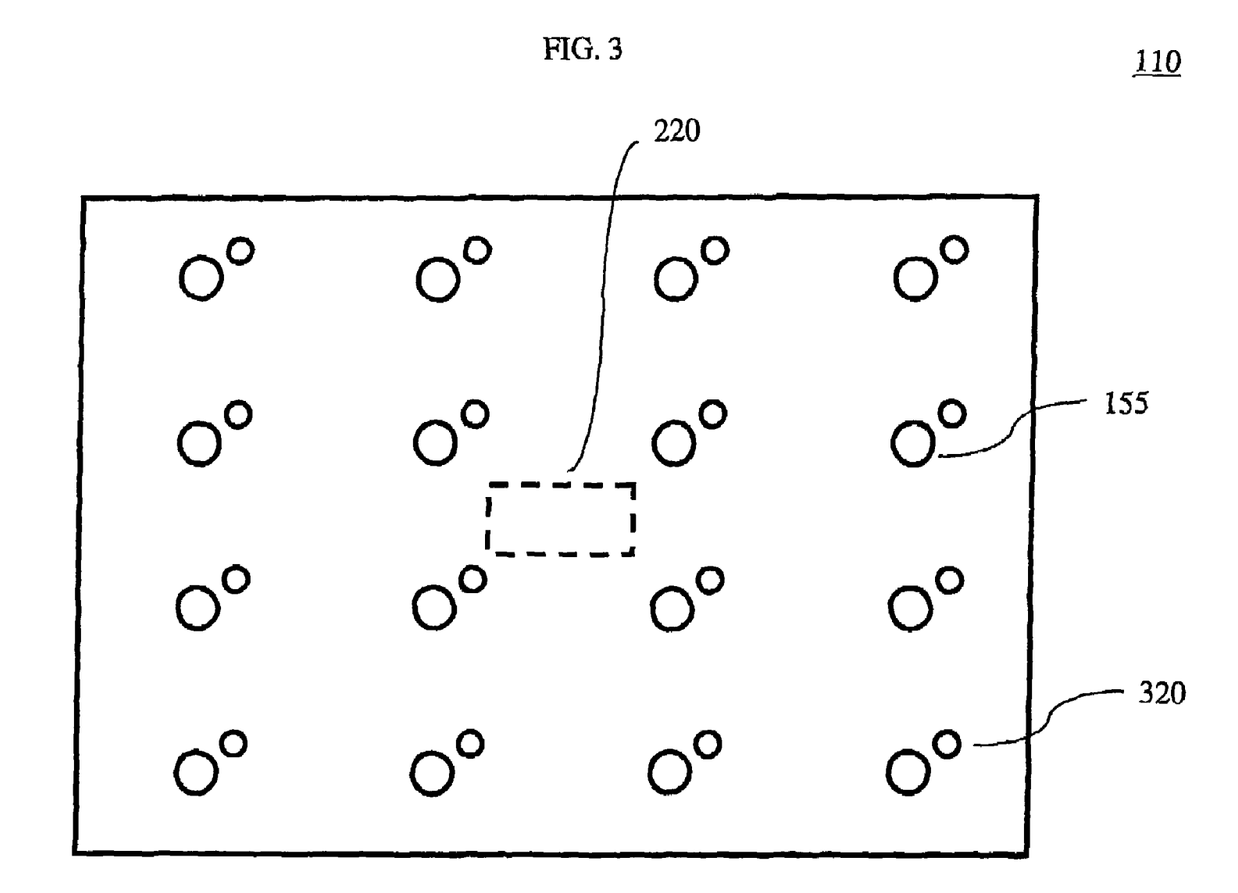
FIG. 3 shows a front view of another exemplary light emitting surface of a pattern generator that is useful for understanding the invention.

Referring to FIG. 3, another embodiment of the pattern generator 110 is shown. In this arrangement, the pattern generator 110 comprises an array of light sources 155, for example light emitting diodes (LED's), incandescent and/or neon bulbs, or any other light sources that can be controlled to generate patterns of light. The individual light sources 155 can be selectable in color and/or controllable in intensity.

As noted, the pattern generator 110 also can include the detector, such as imaging sensor 220. However, the pattern generator also can include one or more detectors 320 capable of detecting screen exit rays. Such detectors are commercially available from a number of vendors, for example from Konica Minolta Business Solutions U.S.A., Inc. of Ramsey, N.J. 07446. When the detector includes a plurality of detectors 320, each detector can be associated with one or more light sources 155. In such an arrangement, the imaging sensor 220 may not be necessary. As shown, the pattern generator 110 is illustratively provided with sixteen (16) light sources 155 and sixteen (16) detectors 320, but the invention is not so limited and any number of light sources 155 and detectors 320 can be provided. For instance, if higher resolution is desired, a greater number of light sources 155 and detectors 320 can be provided. If lower resolution can be accommodated, a smaller number of light sources 155 and detectors 320 can be provided. Moreover, there need not be a one-to-one correspondence between light sources 155 and detectors 320. For example, there can be greater or fewer detectors 320 than there are light sources 155.

Referring again to FIG. 1, one or more functions of the pattern generator 110 can be can be controlled by a processing device 130. The processing device 130 can be, for example, a personal computer, a network appliance, or any other suitable processing device that can generate operating commands for the pattern generator 110, via signaling 131. The operating commands can be wirelessly propagated to the pattern generator 110 or propagated via a port or bus associated with the processing device 130. Further, the processing device 130 can be connected to a communications network. Thus, operation of the pattern generator 110 can be controlled from a remote location, for example from a central location within a theater or a location remote from the theater. Accordingly, the pattern generator 110 can be activated and deactivated when desired. For instance, the pattern generator 110 can be activated for specific video presentations in which the service of the pattern generator 110 has been requested, while the pattern generator 110 can be deactivated for video presentations in which such service has not been requested. Thus, the pattern generator 110 can be used to provide a source of revenue. Indeed, the pattern generator 110 may be controlled by processor 130 such that different identifier patterns can be selected for display from a set of identifiers. For example, a set of identifiers may include a normal identifier or an alternate identifier. As such, processor 130 may select one or a combination of identifiers from the set of identifiers for display.

In another arrangement, the detector 160 can be used to detect control signals, for example a digital data stream can be projected at the detector 160 from a secondary projector 190, such as one which is often used to show advertising and auxiliary material prior to a feature presentation. Again, the secondary projector 190 can receive operating commands from a processing device 130. Alternatively, control can be implemented using a short piece of 35 mm film projected onto the screen via a 35 mm film projector 185.

In another arrangement, a mobile control unit 180 can be used to operate the pattern generator 110. The mobile control unit 180 can be, for example, a remote control, a programmed device such as a hand carried flashlight, or strobe light for delivering control data. For instance, a digital data stream can be projected at the detector 160 from the mobile control unit 180. The digital data stream can carry commands for a given serial number unit or screen identifier, and can program the desired functional operation in the pattern generator 110. The following are exemplary commands:

"Keep alive"—programs the pattern generator 110 to continue periodic or continuous marking for a predetermined time period before terminating and entering a quiescent condition. The time period can be, for example, a specific number of seconds, minutes, hours, days, weeks, months and/or years;

"Shut down"—stops the pattern generator 110 from marking and enter a standby condition;

"Remember"—stores in non-volatile memory within the pattern generator 110 or processing device 170 occurrences of light incident on the screen 105 during the "shut down" mode;

"Change location"—programs a given location and/or screen identifier to be included in the marking sequence; and "Set time/date"—allows date and time setting of the pattern generator 110. The time and date also can be included in the marking sequence.

In yet a further inventive arrangement, upon receiving a specified command, for example an "information retrieval" command or a "refresh" command, the pattern generator 110 can provide data via an output port. The output port can be any output port known in the art. For example, the output port can be serial port, a parallel port, an RF port, an infrared port, or any other type of communications port. Further, data can be output via the light sources 155. Any type of data pertinent to the pattern generator 110 can be provided. For example, the data can be operational data and/or data pertaining to anomalous occurrences. For instance, an anomalous occurrence could be a long period of time in which the pattern generator 110 does not receive AC power, a long period of time wherein the pattern generator 110 does not project images on the screen 105, a specified period of time in which no light is detected by detectors 160 (which is indicative of an obscuration of the screen illumination sensors), or any other occurrences which can be monitored.

Figure 4:
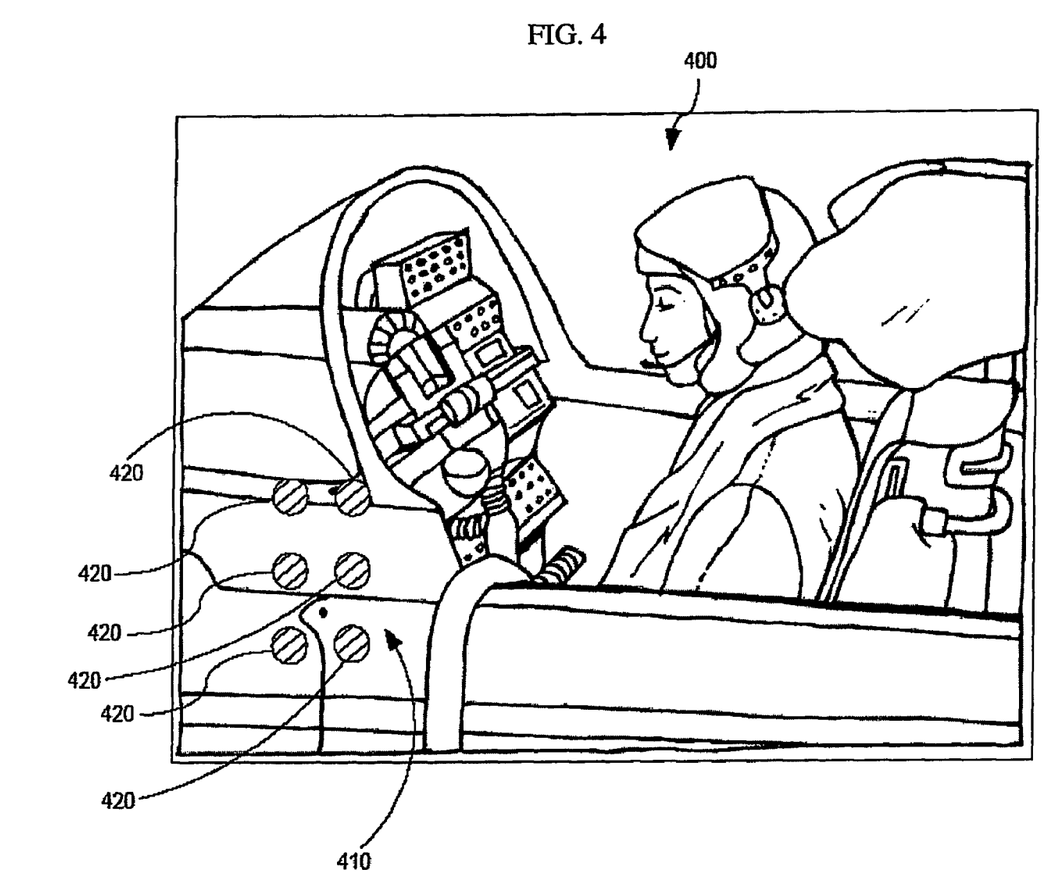
FIG. 4 shows a frame containing an image onto which a marking pattern has been projected.

Referring to FIG. 4, an exemplary frame 400 having an identifier, or marking pattern, 410 is shown. The identifier 410 is distinct from the original image sequence. As defined herein, distinct from the original image sequence means that the identifier is not contained on the storage medium from which the original image sequence is presented. The identifier 410 can comprise one or more symbols 420, for example, one or more characters, dots, lines, geometrical shapes, or any other identifiable symbols that can be projected onto a screen. The identifiers can be projected onto the screen for a time period that is long enough to insure that the identifiers mark one or more frames within the copy.

The identifiers can be projected multiple times during a video presentation, in which case the identifier can be projected at predetermined intervals. The predetermined intervals can be determined by a time period, a number of frames, a number of scenes, or an interval measured in any other way. It should be noted that projecting the identifiers more than once within a video presentation can facilitate identification of the marking pattern in the event that one or more instances of the identifiers should become unreadable on an unauthorized copy of the video presentation.

Figure 5:
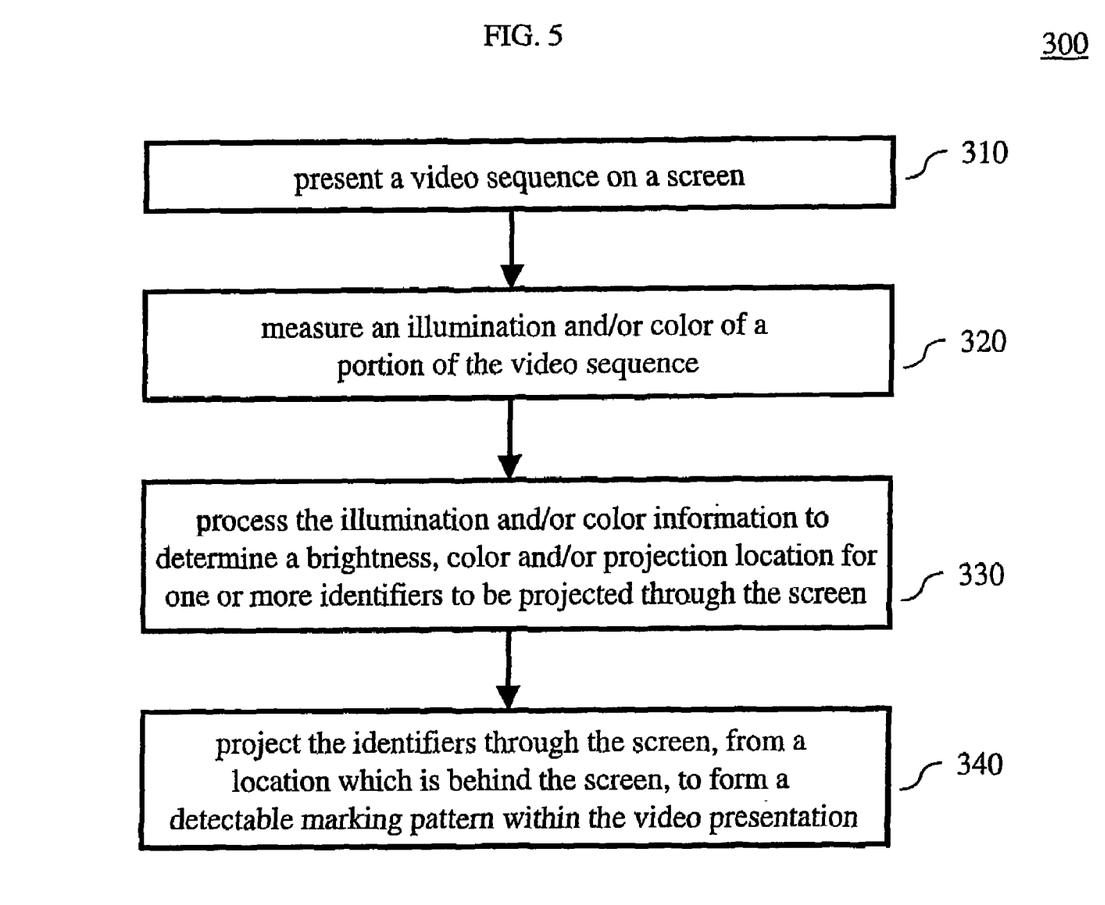
FIG. 5 is a flow chart which is useful for understanding the invention.

Referring to FIG. 5, a flow chart 500 which is useful for understanding the present invention is shown. Beginning at step 510, an image sequence is presented on a screen. An illumination and/or color of at least a portion of the image sequence is measured, as shown in step 520. Proceeding to step 530, the illumination and/or color information is processed to determine a brightness and/or color for identifiers projected onto the screen. The location on the screen through which the identifiers are projected also can be determined based upon the measured illumination and/or color information. The identifiers are then projected through the screen, from a position located behind the screen, to form a marking pattern detectable within the video presentation, as shown in step 540.

Figure 6:
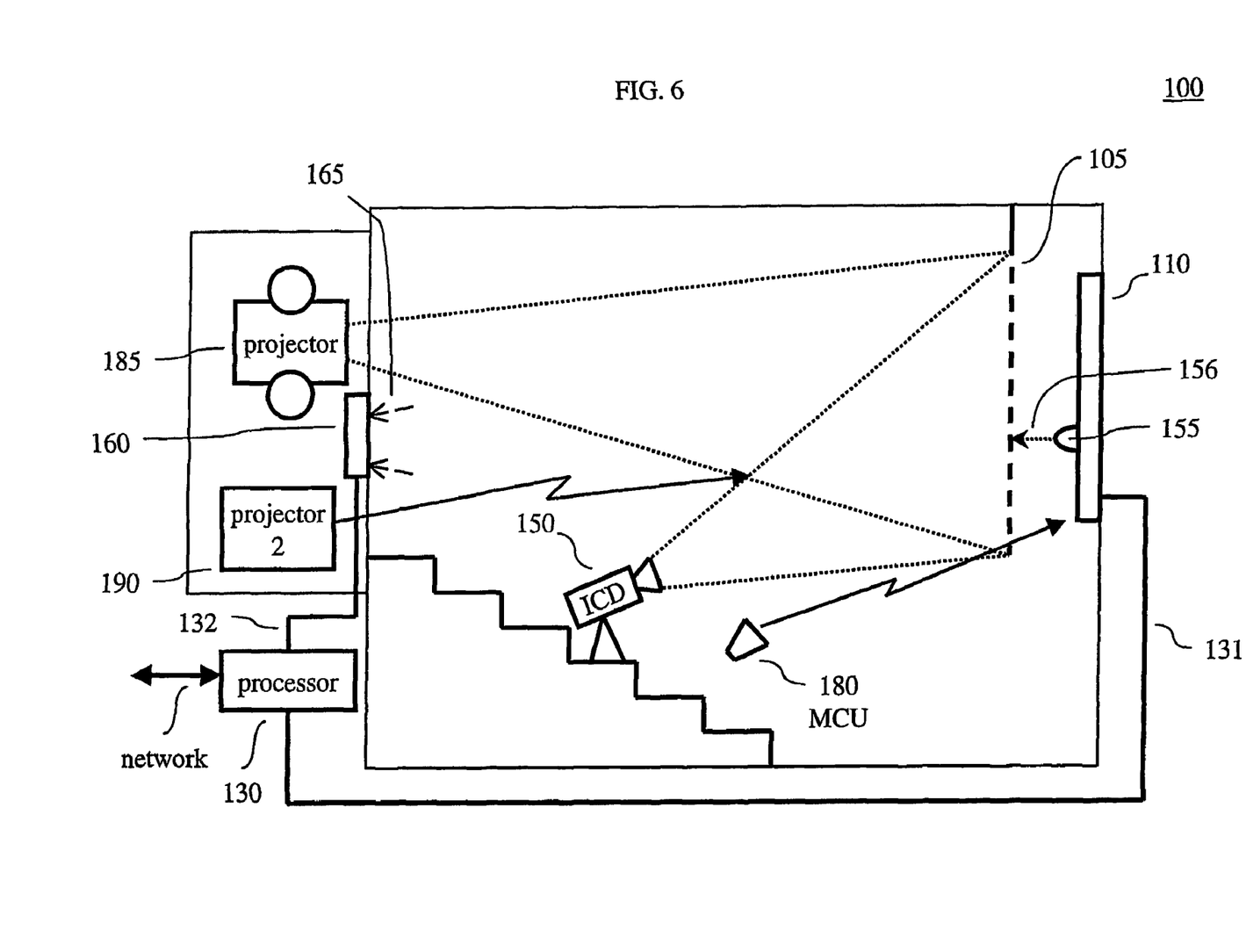
FIG. 6 shows another illustrative embodiment in accordance with the principles of the invention.

In another arrangement the detector (as described above) can be located in front of the screen. This is shown in FIG. 6, where detector 160 is located in front of screen 105 and measures the reflected light levels as represented by arrows 165. An image signal generated by the imaging sensor can be processed to provide a near real time spatial screen map of illumination and color information associated with a projected image to, e.g., processor 130, via signaling 132.

Figure 7:
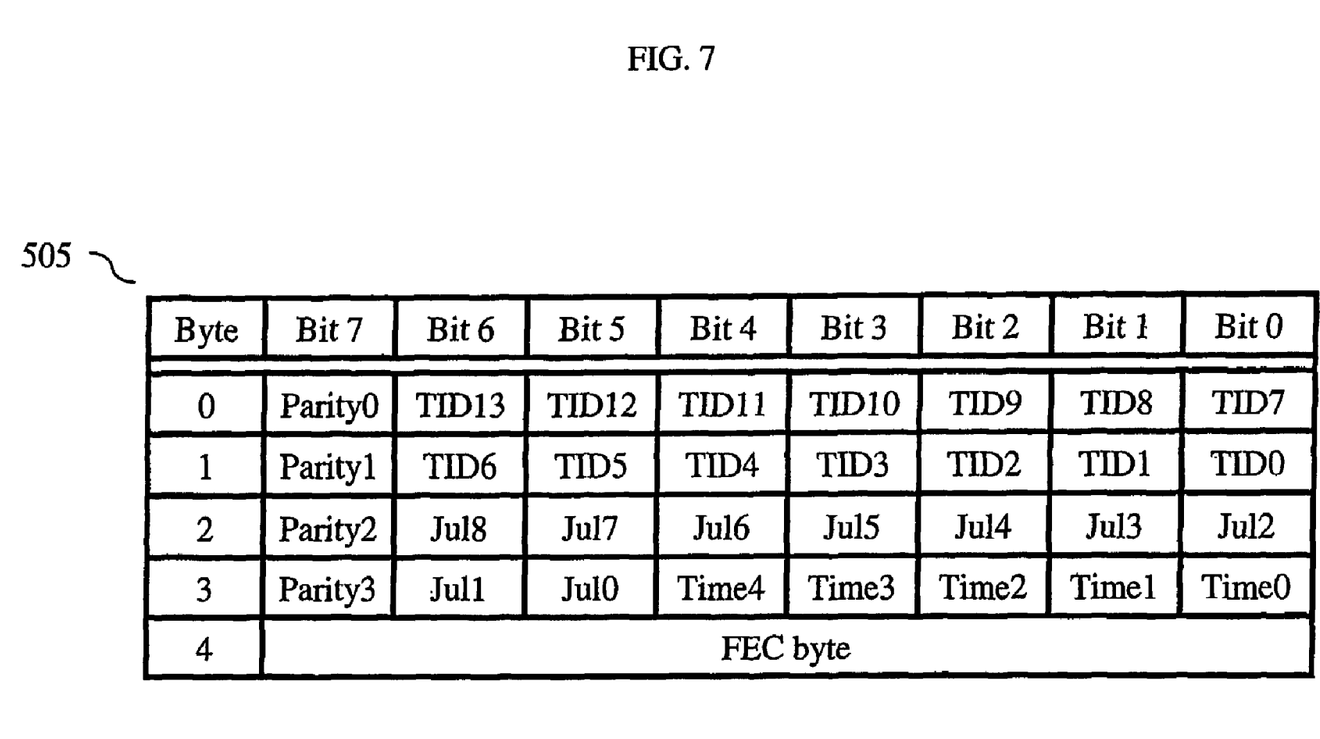
FIG. 7 shows an illustrative form of marking data in accordance with the principles of the invention.

It should be noted that the above-described marking pattern can be generated from marking data. As such, and in order to improve the ability to recover the marking pattern from a recovered pirate recording, an error-correction scheme may be used in the marking pattern to increase the reliability of the data. This is illustrated in FIG. 7, which shows illustrative marking data for use in generating a marking pattern in accordance with the principles of the invention. In particular, marking data 505 comprises 5 bytes of data (bytes 0 through 4) for conveying a theatre ID comprising 14 bits as represented by TID0 through TID13 (bytes 0 and 1), a julian day of the year (0-364) as represented by bits Jul0 through Jul8 (byte 2 and a portion of byte 3) and a time of day in hour increments (0-23) as represented by bits Time0 through Time4 (the remaining portion of byte 3). As can be observed from FIG. 7, bytes 0 through 4 include parity bits, e.g., odd parity bits equal to the XNOR (exclusive NOR) of the other seven bits in each byte. Byte 4 represents a forward error correction (FEC) byte, which is illustratively defined as the XNOR of the other four bytes (bytes 0 through 3). The marking data is converted into a marking pattern, e.g., via processor 130 or projector 115, such that each bit value is represented by, e.g., a color, of one, or more, pixels of the marking pattern. Using this code, if one pixel (or group of pixels) is rendered invalid (e.g., in a subsequent recording), that byte may be corrected, and if one byte is rendered invalid, it can be also be recreated. Although this example uses a simple parity based code, it is clear that one skilled in the art could use one of any variety of error correcting codes, including by way of example, BCH-codes, Reed-Solomon codes, Goppa codes, or convolutional codes.

While the foregoing is directed to the preferred embodiment of the present invention, other and further embodiments of the invention may be devised without departing from the basic scope thereof, and the scope thereof is determined by the claims that follow.

The invention claimed is:

1. A method for marking a copy of an image sequence comprising the steps of:
presenting the image sequence onto a screen; and
from a position located behind the screen, projecting through the screen at least one identifier distinct from the image sequence such that the identifier is displayed using visible light along with the presented image sequence;
wherein the projected at least one identifier represents marking data comprising a forward error correction code.

2. The method according to claim 1, wherein said step of presenting the at least one identifier further comprises the steps of:
measuring an illumination of at least a portion of the image sequence presentation; and
determining a projection brightness for the at least one identifier based upon the measured illumination.

3. The method according to claim 2, further comprising the step of determining a location on the screen through which the at least one identifier is projected based upon the measured illumination.

4. The method according to claim 1, wherein said step of presenting the at least one identifier further comprises the steps of:
measuring a color of light associated with at least a portion of the image sequence presentation; and
determining a projection color for the at least one identifier based upon the measured color of light.

5. The method according to claim 4, further comprising the step of determining a location on the screen through which the at least one identifier is projected based upon the measured illumination.

6. The method according to claim 1, wherein the at least one identifier is presented at periodic intervals.

7. The method according to claim 1, wherein the marking data represents at least one of a theatre identifier, date and/or time.

8. The method according to claim 1, wherein the forward error correction code represents an exclusive NOR operation of at least some of the marking data.

9. The method of claim 1, wherein the image sequence is a movie.

10. The method of claim 1, wherein the projecting step includes the step of communicating a command for use in controlling the projection of the at least one identifier.

11. The method of claim 10, wherein the step of communicating uses a 35 mm piece of film.

12. The method of claim 10, wherein the step of communicating uses a screen advertising projector.

13. The method of claim 10, wherein the step of communicating uses a hand-held stroboscope.

14. A system for identifying a copy of an image sequence comprising:
a pattern generator for projecting through a screen at least one identifier distinct from a image sequence being presented on the screen such that the identifier is displayed using visible light along with the presented image sequence
wherein the projected at least one identifier represents marking data comprising a forward error correction code.

15. The system of claim 14, wherein the at least one identifier is selected from a set of identifiers and wherein the system further comprises a processor coupled to the pattern generator for controlling selection of the at least one identifier from the set of identifiers.

16. The system of claim 14, further comprising:
a detector for measuring an illumination of at least a portion of the image sequence presentation; and
a processor for determining a projection brightness for the at least one identifier based upon the measured illumination.

17. The system of claim 16, wherein the processor also determines a location on the screen through which the at least one identifier is projected based upon the measured illumination.

18. The system of claim 16, wherein the detector and the processor are contained within the pattern generator.

19. The system of claim 14, further comprising:
a detector for measuring a color of light associated with at least a portion of the image sequence presentation; and
a processor for determining a projection color for the at least one identifier based upon the measured color of light.

20. The system of claim 19, wherein the processor also determines a location on the screen through which the at least one identifier is projected based upon the measured illumination.

21. The system of claim 19, wherein the detector and the processor are contained within the pattern generator.

22. The system of claim 14, wherein the system is configured to present the at least one identifier at periodic intervals.

23. The system of claim 14, wherein the marking data represents at least one of a theatre identifier, date and/or time.

24. The system of claim 14, wherein the forward error correction code represents an exclusive NOR operation of at least some of the marking data.

25. The system of claim 14, wherein the image sequence is a movie.

26. The system of claim 14, wherein the pattern generator receives a command for use in controlling the projection of the at least one identifier.

27. The system of claim 26, wherein the command is provided by a 35 mm piece of film.

28. The system of claim 26, wherein the command is provided by a screen advertising projector.

29. The system of claim 26, wherein the command is provided by a hand-held stroboscope.

* * * * *